Patented Sept. 17, 1940

2,215,255

UNITED STATES PATENT OFFICE 2,215,255

STABILIZATION OF STYRENE

Sylvia M. Stoesser and Ray H. Boundy, Midland, Mich., assignors to The Dow Chemical Company, Midland, Mich., a corporation of Michigan No Drawing. Application June 28, 1938,
Serial No. 216,297

4 Claims. (Cl. 23—250)

This invention concerns a method for the stabilization of styrene against polymerization and also concerns the stabilized compositions so prepared.

It is well-known that styrene polymerizes quite rapidly upon standing at room temperature and even more rapidly when warmed or exposed to light. For example, monomeric styrene, which is a thin mobile liquid, polymerizes to a thick gummy mass during storage for four months in the dark room temperature. An equal amount of polymerization occurs when monomeric styrene is exposed to ordinary daylight at room temperature for only three weeks. Longer storage under either of these conditions results in further polymerization with the eventual formation of a tough resinous solid which is inconvenient to handle as well as unsuitable for many of the uses to which styrene is ordinarily put.

Because of this tendency toward polymerization, storage and shipment of monomeric styrene has been a difficult problem. We are aware that a number of substances, e. g., quinone, trinitrobenzene, etc., have been proposed as inhibitors for the polymerization of styrene, but many such substances are expensive, or do not have the property of inhibiting polymerization to a sufficient degree, or cannot readily be removed from the stabilized composition to recover the styrene in substantially pure and polymerizable condition.

An object of this invention is to provide certain new agents for the stabilization of styrene which may readily be removed to recover the styrene in substantially pure, colorless and readily polymerized form. Another object is to provide stabilizing agents which are effective in small concentrations, inexpensive, and convenient to handle. Other objects will be apparent from the following description of the invention.

We have found that certain low molecular weight hydrocarbon gases, namely, propane, propylene, isobutane, and butylene, possess the property of inhibiting the polymerization of styrene, and that styrene containing one or more of these gases in solution may be held under the usual conditions of storage and shipment over long periods of time without undergoing appreciable polymerization. When desired, the styrene may be recovered from such stabilized compositions in a substantially pure, colorless, and readily polymerized form by vaporizing off the dissolved gas. Removal of the gases in this manner is usually carried out by boiling the stabilized styrene under ordinary or reduced pressure in a vessel equipped with a reflux condenser to prevent loss of styrene through vaporization. Since the hydrocarbon gases employed as stabilizing agents are only sparingly soluble in styrene, they may thus be removed in a very short time. If desired, the gases may be collected and stored for re-use. The styrene is in no way changed by the stabilization treatment and, after removal of the stabilizing agent, may be polymerized to produce polymers which are identical with polymers prepared from unstabilized material.

Although some degree of stabilization is secured by the presence of mere traces of the new stabilizing agents, we prefer to prepare our stabilized styrene composition by passing the desired gas into liquid monomeric styrene until the latter has been saturated with the gas. Smaller amounts of the stabilizing agent may of course be employed in many instances, the smallest practical amount being dependent upon the particular hydrocarbon gas employed as the stabilizing agent, the period over which the material is to be stored without undergoing appreciable polymerization, the temperatures encountered during storage, etc. If desired, styrene may be saturated at superatmospheric pressure with the gaseous stabilizing agent in order to obtain a higher concentration of the latter in the styrene than is possible at atmospheric pressure, but such use of elevated pressure is inconvenient and usually unnecessary.

The following table presents data illustrating the degree of stabilization secured by employing the gases propane, propylene, isobutane, and butylene as stabilizing agents. In each experiment, a saturated solution of the gas in styrene was stored at room temperature for the time and under the conditions stated in the table. The symbols $a$–$f$, used to indicate the condition of the material after the stated time, carry the following meanings:

(a) No thickening or other visible change occurred;

(b) The material is slightly more viscous than freshly distilled styrene;

(c) The material is a viscous but free-flowing liquid;

(d) The material is a very viscous liquid;

(e) The material is a very soft solid resin;

(f) The material is a tough solid resin.

A symbol followed by "+" indicates that the material was polymerized to a somewhat lesser extent than that designated by the symbol itself.

i. e., a rating of "b+", for example, indicates that the condition of the material was intermediate between that designated by "b" and "a".

Table

| Experiment number | Stabilizing agent | Conditions of storage | Condition of composition after storing for— | | | |
|---|---|---|---|---|---|---|
| | | | 8 days | 11 days | 23 days | 135 days |
| 1 | Blank | 25° C. in light | c+ | d+ | e | |
| 2 | do | 25° C. in dark | a | b | c | e |
| 3 | Propane | 25° C. in light | a | b+ | | |
| 4 | Propylene | do | a | b+ | | |
| 5 | Butylene | do | a | a | b+ | |
| 6 | do | 25° C. in dark | a | a | a | |
| 7 | Isobutane | 25° C. in light | a | a | b | |
| 8 | do | 25° C. in dark | a | a | a | a |

Other modes of applying the principle of our invention may be employed instead of those explained, provided the ingredients stated by any of the following claims or the equivalent of such stated ingredients be employed.

We therefore particularly point out and distinctly claim as our invention:

1. A composition of matter comprising styrene having dissolved therein a hydrocarbon gas selected from the group consisting of propane, propylene, isobutane, and butylene, in a proportion sufficient to inhibit polymerization of the styrene.

2. A composition of matter comprising styrene having isobutane dissolved therein in a proportion sufficient to inhibit polymerization of the styrene.

3. A composition of matter comprising styrene having butylene dissolved therein in a proportion sufficient to inhibit polymerization of the styrene.

4. A composition of matter comprising styrene having propylene dissolved therein in a proportion sufficient to inhibit polymerization of the styrene.

SYLVIA M. STOESSER.
RAY H. BOUNDY.